Figure 12:
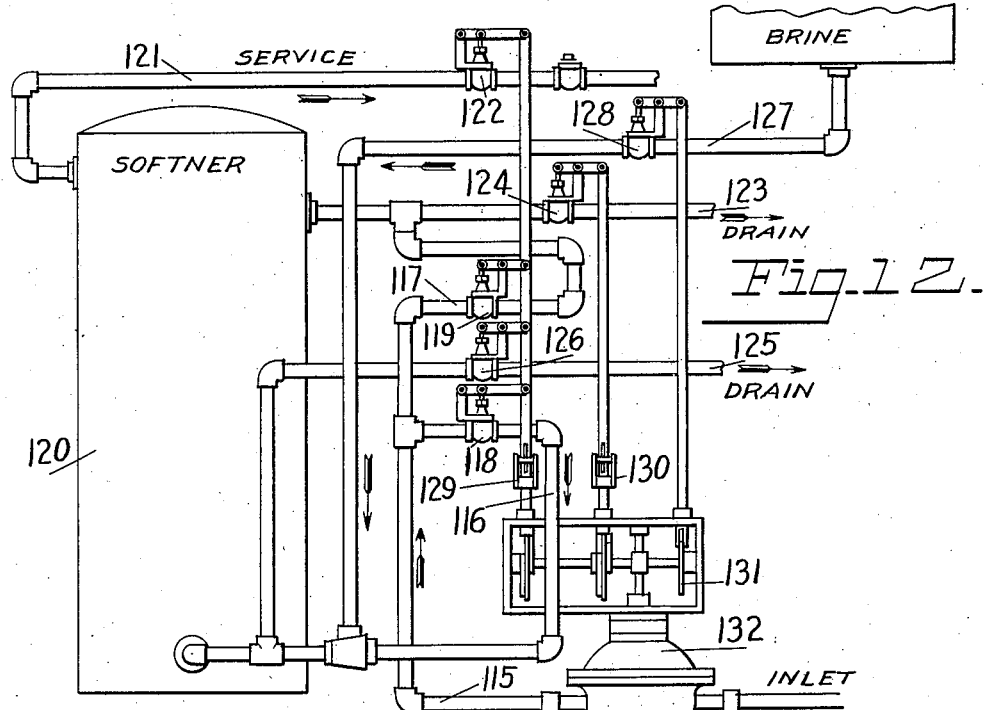

April 17, 1934.  E. T. TURNER  1,955,693
WATER SOFTENING APPARATUS
Filed Feb. 25, 1925  6 Sheets-Sheet 1
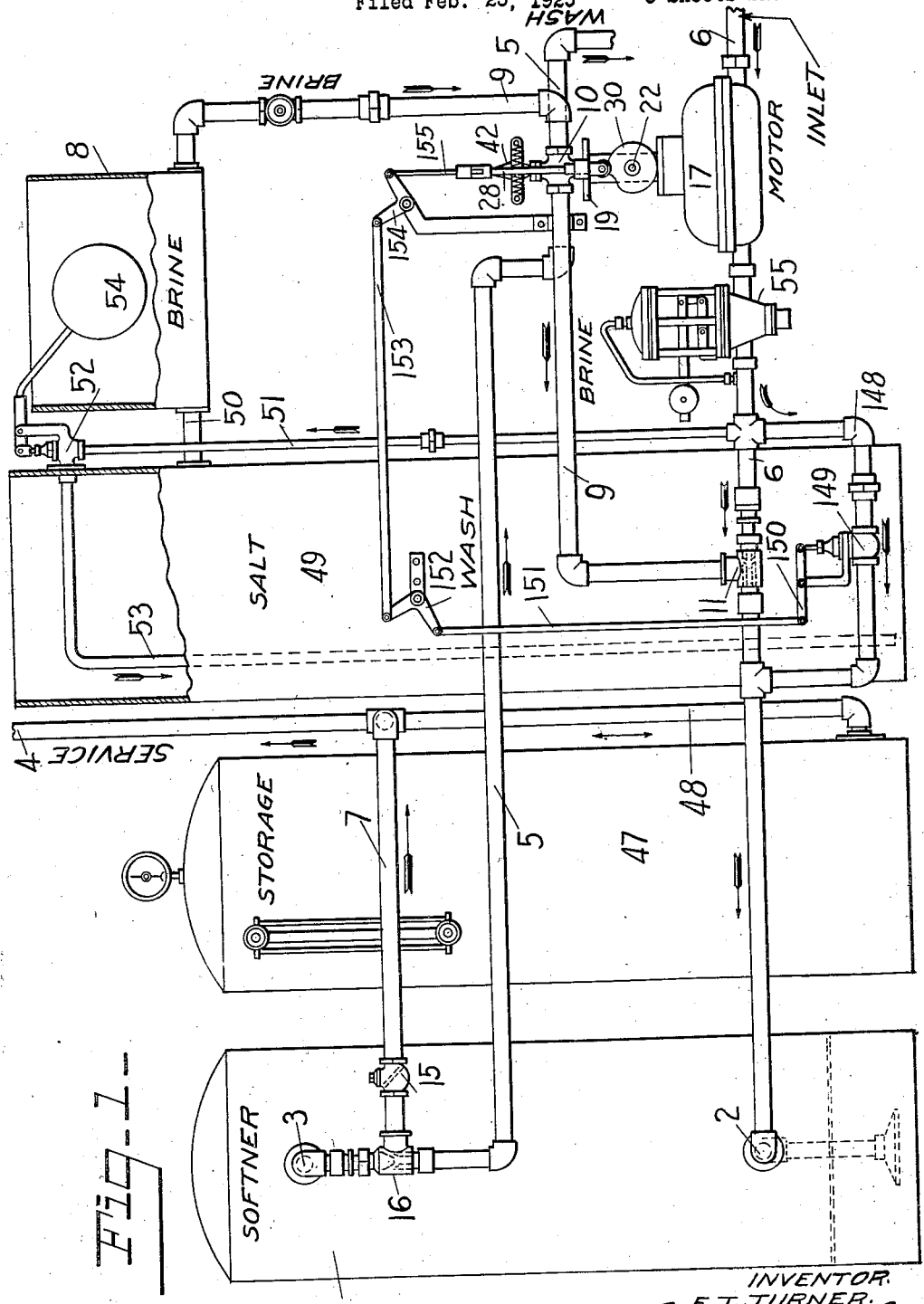

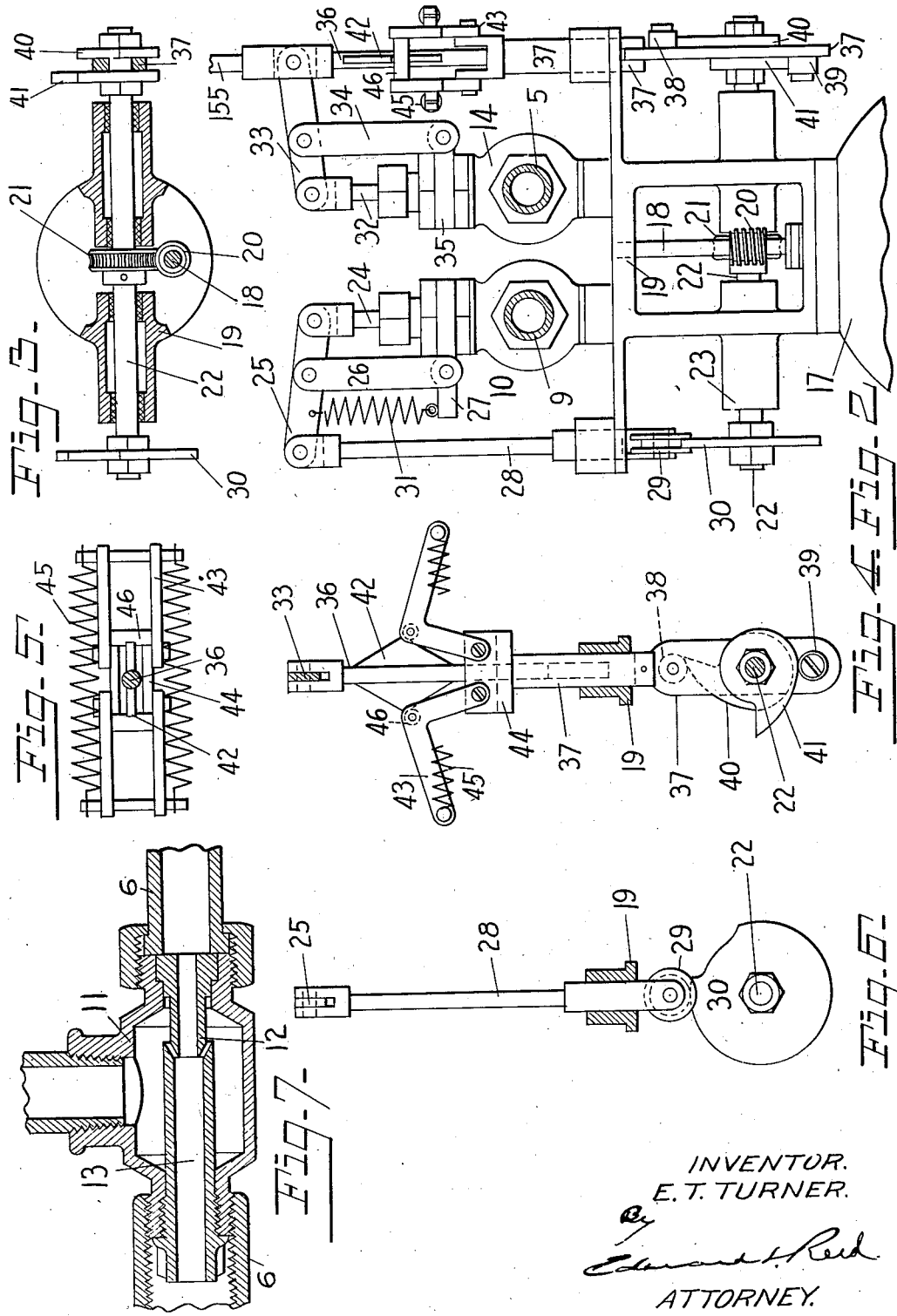

April 17, 1934.  E. T. TURNER  1,955,693
WATER SOFTENING APPARATUS
Filed Feb. 25, 1925  6 Sheets-Sheet 3
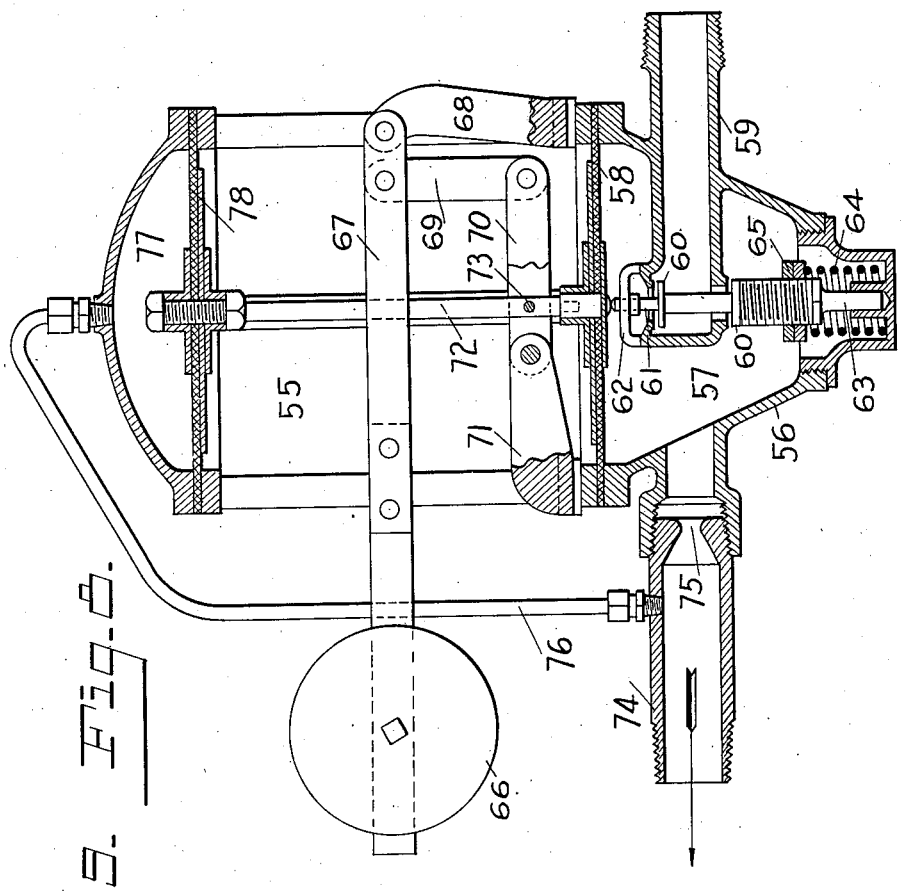
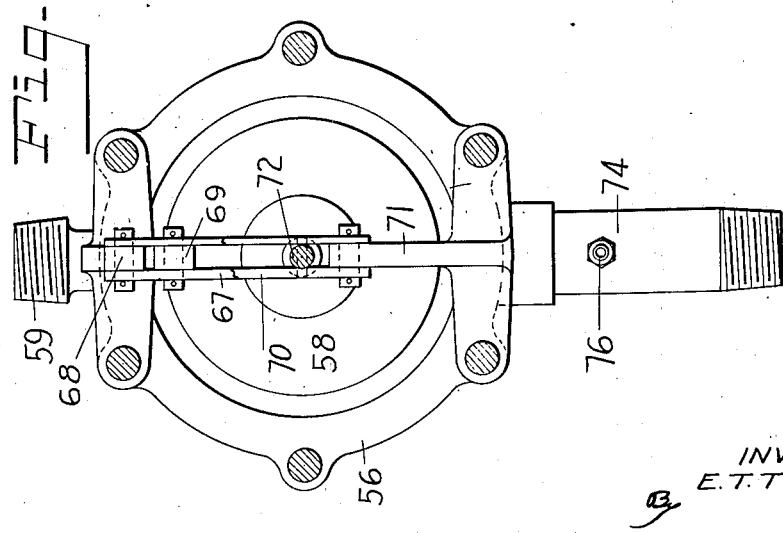
INVENTOR.
E. T. TURNER.
By Edmund H. Reed.
ATTORNEY

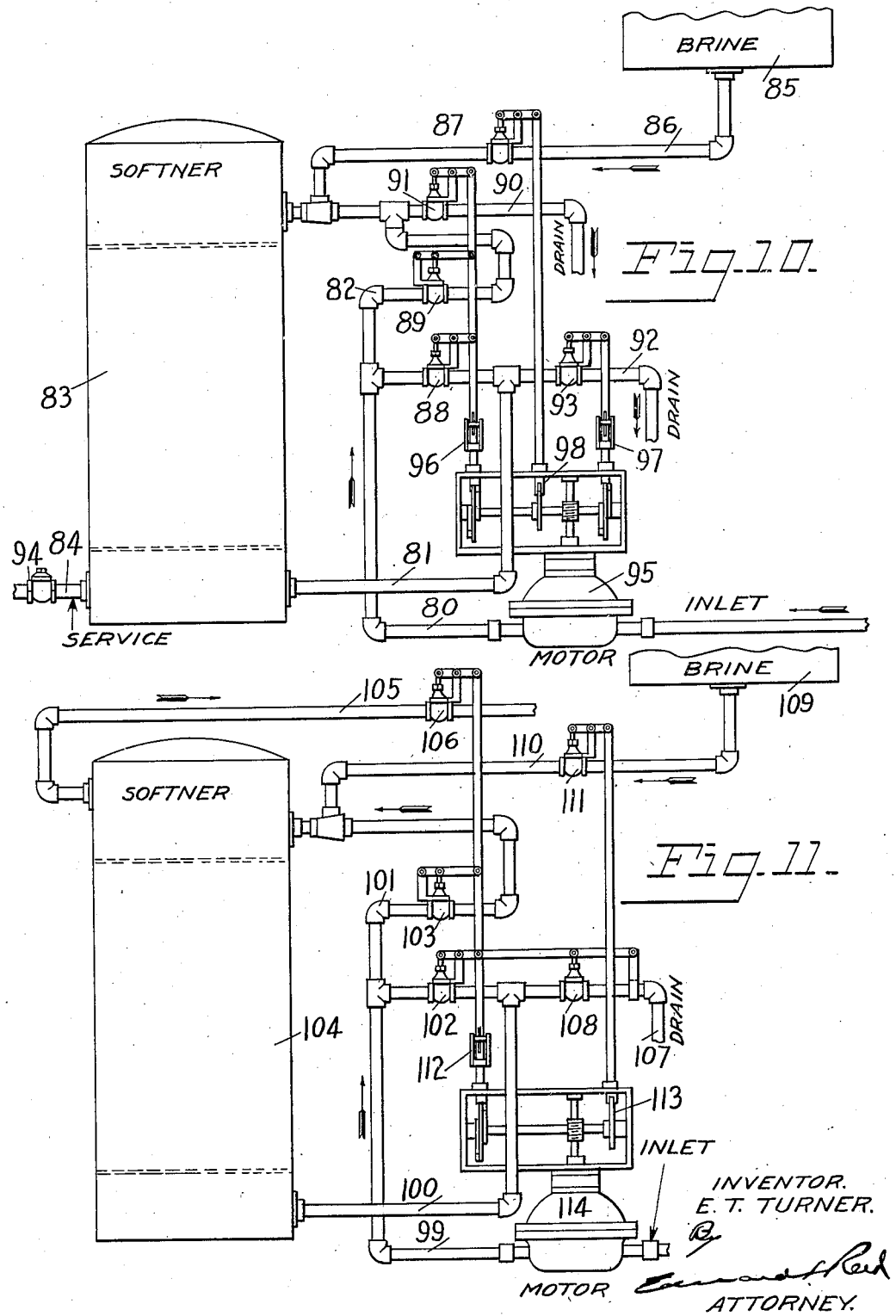

April 17, 1934.  E. T. TURNER  1,955,693
WATER SOFTENING APPARATUS
Filed Feb. 25, 1925  6 Sheets-Sheet 5

INVENTOR.
E. T. TURNER.
ATTORNEY.

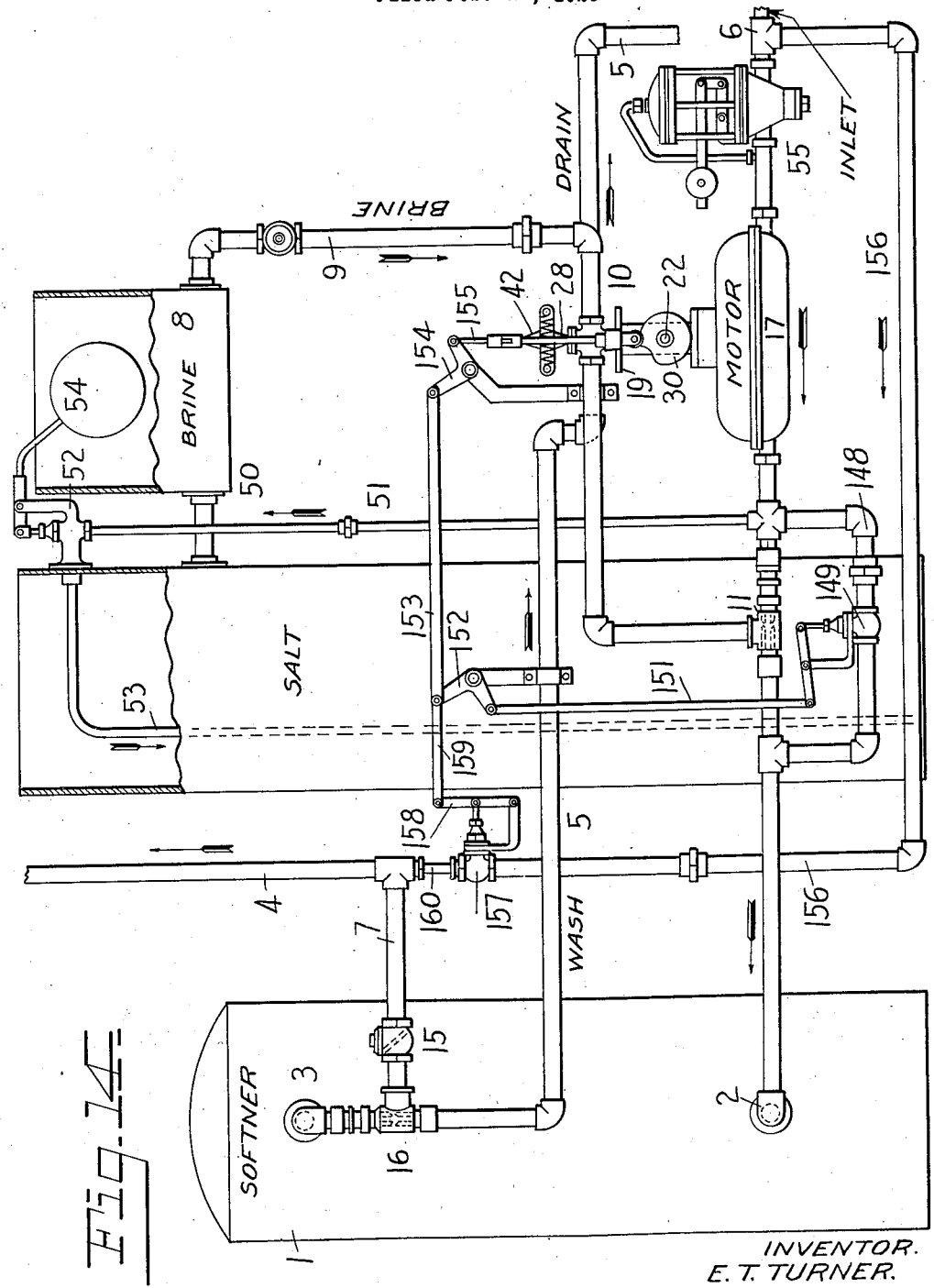

Patented Apr. 17, 1934

1,955,693

UNITED STATES PATENT OFFICE 1,955,693

WATER SOFTENING APPARATUS

Edward T. Turner, Dayton, Ohio, assignor to General Water Treatment Corporation, New York, N. Y., a corporation of Delaware Application February 25, 1925, Serial No. 11,435

46 Claims. (Cl. 210—24)

This invention relates to water softening apparatus and more particularly to that type of water softening apparatus which employs as a water softening agent a material having the property of exchanging its normal base for the substances which render the water hard, such as zeolite, glauconite and the like.

In the normal operation of a water softener of this character the water softening material gradually loses its softening property as it gives up its normal base and absorbs the calcium, magnesium or the like, from the water. Consequently at intervals dependent upon the quantity of water softened, it is necessary to recondition the water softening material by first subjecting it to the action of a regenerating solution, such as salt water, which will displace the substances absorbed from the hard water and restore the normal base of the material and to then rinse or wash out the water softening material and its container to remove the regenerating solution and sediment therefrom. Obviously the water softening operation and the reconditioning operations cannot proceed simultaneously in the same softening device and consequently the ordinary water softening apparatus is inoperative, and the supply of soft water wholly interrupted, at more or less frequent intervals while the water softening material is being reconditioned. The reconditioning is usually manually controlled and it is necessary for the person in charge of the apparatus to interrupt the flow of hard water to the container and introduce therein the necessary salt and water and, after this salt solution has remained in contact with the water softening material for a sufficient length of time, to wash out the container and reconnect the same with the city water and the service line. These operations are all performed by hand and as each operation is effective for a considerable length of time the manual control of the mechanism results in considerable inconvenience aside from the fact that it interrupts the supply of soft water, and because of this inconvenience the reconditioning is likely to be neglected.

One object of the present invention is to provide a water softening apparatus which will provide a continuous supply of water to the service line.

A further object of the invention is to provide a water softening apparatus in which the reconditioning operations will be automatically effected.

A further object of the invention is to provide a water softening apparatus in which the reconditioning operations will be automatically effected, both as to time and as to duration, according to the amount of hard water flowing through the supply pipe.

A further object of the invention is to provide a water softening apparatus with means for automatically delivering hard water to the service line during the reconditioning operation.

A further object of the invention is to provide a water softening apparatus in which a storage receptacle will be interposed between the container and the service line to provide a reserve storage of soft water for use during the reconditioning period.

A further object of the invention is to provide a water softening apparatus having improved means for generating salt solution by means of which sufficient salt may be deposited in the apparatus at one time to last over a long period of operation.

A further object of the invention is to provide means for automatically regulating the flow of water through the hard water supply pipe.

Other objects of the invention will appear as the apparatus is described in detail.

Figure 13:
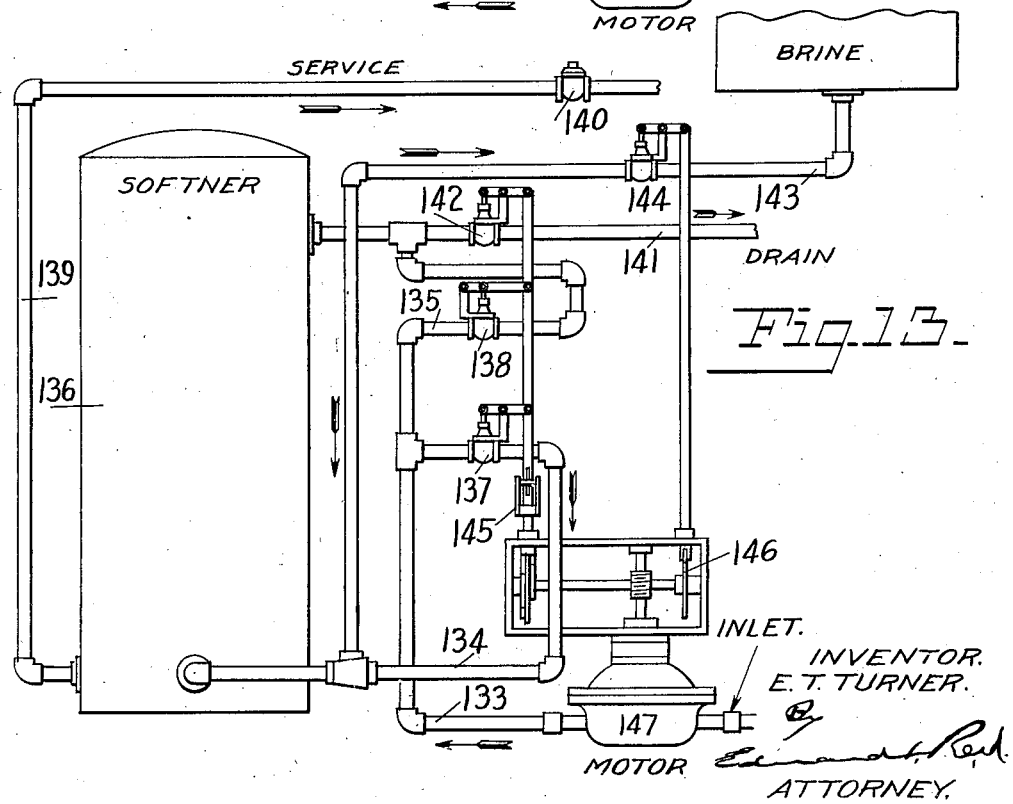

In the accompanying drawings Fig. 1 is an elevation of a water softening apparatus embodying my invention; Fig. 2 is a detail view of the automatic valve operating devices; Fig. 3 is a sectional detail view of the cam shaft forming part of the valve controlling mechanism; Fig. 4 is a side elevation, partly in section, of the quick opening device constituting a part of one of the valve controlling mechanisms; Fig. 5 is a top plan view of the quick opening device of Fig. 4, with the rod in section; Fig. 6 is a side elevation, partly in section, of the valve opening device which controls the regenerating solution; Fig. 7 is a sectional detail view of the injector for introducing regenerating solution into hard water supply line; Fig. 8 is a sectional detail view of the device for controlling the flow of water through the supply pipe; Fig. 9 is a plan view of the same; Fig. 10 is an elevation of a modified form of a water softener in which the fluid flows in different directions through the container during different portions of the operation; Fig. 11 is an elevation showing a modification of the device of Fig. 10; Fig. 12 is an elevation of a further modification of the water softener; Fig. 13 is a further modification of the water softener; and Fig. 14 is a side elevation of a water softener similar to that of Fig. 1 but omitting the storage tank.

In these drawings I have illustrated one embodiment of my invention, together with several modifications thereof designed to cause the liquids to flow through the water softening device in different directions but it will be understood that these various forms of the apparatus have been chosen for the purposes of illustration only and that the apparatus may take various forms and the control thereof may be effected in various ways without departing from the spirit of the invention.

In my co-pending application, filed October 13, 1924, Serial No. 743,385, I have shown and described a water softening apparatus in which the reconditioning operations are automatically controlled by moving a series of softening devices successively into positions to receive regenerating solution and wash water. The present invention comprises a single stationary softening device having suitable mechanism for effecting the reconditioning operations.

In Figs. 1 to 9, I have shown a simple embodiment of my invention. As there shown the apparatus comprises a water softening unit consisting of a container 1 adapted to contain a suitable quantity of water softening material, such as zeolite, glauconite or the like, and is provided at its lower end with an inlet 2 for hard water and at its upper end with an outlet 3 for soft water. In the present apparatus, the inlet 2 serves both for the introduction into the container 1 of water to be softened and of regenerating solution, and the outlet 3 serves both as an outlet for soft water and as an outlet for regenerating solution and wash water and is therefore adapted to be connected either with a service pipe 4 or with a drain pipe 5. The inlet 2 is connected with a hard water supply pipe 6 which leads to the city water line or to some other suitable source of supply for water to be softened. This water passes from the supply pipe to the container 1 thence upwardly through the water softening material, which removes the substances which harden the water, and the soft water is discharged through the outlet 3 and a connecting pipe 7 to the service pipe 4, this pipe 7 forming in effect part of the service pipe.

The reconditioning of the water softening material is effected by introducing the regenerating solution into the water which is delivered to the container 1 by the hard water supply pipe. The introduction of the regenerating solution into the water is automatically controlled according to the amount of water passing through the supply pipe so that the regenerating solution will be introduced into the water softening unit or container 1 at proper intervals and will be caused to flow through the same for a proper length of time to regenerate the water softening material. To this end a source of supply for regenerating solution, such as a brine tank 8, is connected by a pipe 9 with the hard water supply pipe 6 and the flow of water from the brine tank to the supply pipe 6 is controlled by a valve 10 which is automatically operated at intervals determined by the flow of the water through the supply line 6. The regenerating solution is preferably introduced directly into the supply pipe by means of an injector which consists of a casing 11 in which is provided a relatively large chamber, into one end of which projects a nozzle 12 of reduced diameter which is connected with the outer side of the supply pipe 6, that is, that side of the supply pipe which is connected with the source of supply. A discharge tube 13 extends into the opposite end of the chamber and is connected with the inner side of the supply pipe, that is, the side leading to the container. The discharge tube 13 is of considerably greater diameter than the inlet nozzle 12 and is so arranged that the inlet nozzle will discharge directly into the tube, the adjacent ends of the nozzle and the tube being so arranged as to provide a space between them which will connect the tube with the interior of the chamber in the casing 11. This chamber is also connected with the regenerating solution pipe 9 and when the valve 10 is open a constant supply of regenerating solution will be delivered to the chamber in casing 11 and the discharge of the water under pressure through the nozzle 12 into the discharge tube 13 will create a suction in the latter tube which will draw the regenerating solution into the tube along with the hard water and thus cause the same to be delivered to the water softening unit.

The regenerating solution which is thus delivered to the water softening unit or container 1 is discharged through the drain pipe 5 which, in the present instance, as has been explained, is connected with the container through the outlet 3. The flow of liquid through the drain pipe 5 is controlled by a valve 14 which is also automatically controlled according to the flow of water through the hard water supply pipe. Interposed between the service line 4 and the outlet 3 is a check valve 15 which is so arranged that when the valve 14 in the waste line is closed the pressure of the water in the container will open the valve and cause that water to flow through the service line when an outlet in that line has been opened. When the valve 14 in the waste pipe is opened the liquid passing through the outlet 3 will flow through the waste pipe 5 and the back pressure in the service line will hold the check valve 15 closed so that the regenerating solution and wash water will not enter the service line. To guard against the possibility of the pressure in the service line falling to such an extent that the check valve 15 might open and permit portions of the regenerating solution and wash water to enter the service line, I have connected the service pipe and the waste pipe 5 with the outlet 3 through an injector 16 similar to that shown in Fig. 7 and which is so arranged that the discharge nozzle will discharge the liquid from the container under pressure into the waste pipe, thus preventing the same from entering the service line and tending to create a suction in the service line which holds the check valve 15 closed.

In the present arrangement of the apparatus the two valves 10 and 14 serve to control the reconditioning of the water softening material, and these valves may be manipulated either manually or automatically. By the proper operation of these valves the water softening unit will be disconnected from the service pipe and the regenerating solution introduced into the same and caused to be discharged therefrom through the waste pipe 5. After a proper interval the introduction of regenerating solution will be interrupted and the water delivered to the container from the supply pipe will serve as wash water to wash out from the container the regenerating solution and sediment, which will also be discharged from the waste pipe 5. After a further interval the valve in the waste pipe is closed and the water softening unit connected with the service line, thus again putting it in operation for water softening purposes. The automatic control of the valves 10 and 14 is preferably accomplished by means of a water motor which also constitutes a meter to the extent that its movement is in proportion to the amount of water passing through the supply pipe 6 and it thus causes the operation of the valves at intervals determined by the amount of water so passing through the supply pipe. In the present instance, I have shown this motor at 17, but inasmuch as it is of a well-known type it is not necessary to describe the same in detail. Suffice it to say that the flow of the water through the motor, or meter, causes the rotation of a motor shaft 18 which projects upwardly through the top of the motor casing and is journaled at its upper end in a frame 19 rigidly secured to the motor casing and serving to support the various parts of the controlling mechanism. The shaft 18 has secured thereto a worm 20 which meshes with a worm wheel 21 secured to a transverse shaft 22 journaled in bearings 23 also carried by the frame 19. The upper portion of the frame 19 serves as a support upon which the valves 10 and 14 are mounted, although it will be obvious that any suitable support may be provided with these valves or that they may be supported wholly by the respective pipes. In the normal operation of the water softening apparatus the valves 10 and 14 are both closed and the hard water flows through the suply pipe 6 and motor 17 to the water softening unit. In the present form of the apparatus there is no valve in the water pipe but this is always in open communication with the container 1. The valve operating mechanism for the two valves is of such a character and is so timed that the reconditioning of the water softening material will be effected after a predetermined quantity of water has been softened, the interval being so gaged that the reconditioning will be effected before the water softening material has become inert or has lost its softening properties to such an extent that the water will not be softened. The automatic controlling device or motor is shown as conveniently arranged in the supply line in advance of other parts of the apparatus but it will be obvious that it may be arranged at any point in advance of the service line and will be controlled by the flow of water through the supply pipe. The supply line leads to the point of separation between the service line and the drain pipe and includes all channels of water flow in advance of that point.

The operation of the valves may be controlled by any suitable mechanism which will cause them to open and close at the proper intervals but preferably the timing is effected by means of cams. In the present apparatus the valve 10 for the regenerating solution pipe 9 comprises a reciprocatory valve stem 24 which is connected with one end of a lever 25 which is pivotally mounted on a supporting link 26 carried by a fixed support which, in the present instance, is mounted on the valve casing, as shown at 27. The other end of the lever 25 is connected with an actuating rod 28 which is guided in a part of the frame 19 and the lower end of which carries a roller 29 which is held in engagement with a cam 30 on the shaft 22 by means of a spring 31 acting on the lever 25. The arrangement is such that when the roller is in engagement with the concentric portion of the cam surface the valve will be held in its closed position but when the cut-away portion of the cam is brought into line with the roller the spring 31 will open the valve and retain the same open until the roller again engages the concentric periphery of the cam. It will thus be apparent that the valve will be opened once upon each complete rotation of the cam shaft 22 and will be held open for a period of time controlled by the shape of the cam. The speed of the shaft 22 is so controlled as to permit the desired quantity of water to be delivered to the water softening unit between the successive openings of the valve.

It is desirable that the valve 14, which controls the waste pipe, should be quickly opened and closed and I have shown in Figs. 2, 4 and 5, an apparatus which will effect this quick opening and closing of the valve. The valve 14 also comprises a reciprocatory valve stem 32, one end of which is connected with a lever 33 pivotally mounted on the upper end of a link 34, the lower end of which is mounted on a fixed support, in the present instance a part 35 carried by the valve casing. The opposite end of the lever 33 is pivotally connected with the outer end of an actuating rod 36, the lower end of which is slidably mounted in an axial recess formed in the upper end of a plunger 37 which is guided in a suitable bearing in the frame 19. The lower end of this plunger is provided with two projections or rollers 38 and 39 which are here shown as projecting in opposite directions from the plunger and which are arranged to be acted on respectively by cams 40 and 41 secured to the cam shaft 22. These cams are here shown as snail cams and are so arranged with relation one to the other that the valve will be held in its closed and open positions for the desired periods of time. It will be noted that the arrangement of the cams with relation to the plunger is such that the cam 40 will move the plunger upwardly and the cam 41 will move the same downwardly. The connection between the plunger 37 and the actuating rod 36 is such that these parts may have relative movement, and operative movement will not be imparted to the rod 36 and to the valve until just before the cam, 40 or 41, clears its roller on the plunger. As here shown, the actuating rod 36 has secured thereto and projecting from the opposite sides thereof, tapered projections 42 which, if desired, may consist of the opposite edges of a diamond shaped plate rigidly secured to the rod and projecting beyond the respective sides thereof. The angles or apices of the two projections or angular plates 42 are arranged in transverse alinement. Cooperating with these tapered projections or with the angular plate 42 are bell crank levers 43 each having one arm pivotally mounted on a collar 44 secured to the upper end of the plunger 37 and having their other ends connected one to the other by means of a spring 45 which will tend to move the angles of the two levers one toward the other. Each lever 43 is provided at the angle thereof with a stud or roller 46 which engages with the plate 42 and is held in contact therewith by the spring 45. With the parts in the positions shown in Figs. 2 and 4, the levers 43 are acting on the lower inclines of the diamond shaped plate 42 and thus serve to hold the actuating rod 36 in its uppermost position with the valve closed. In these drawings, however, the cam 40 has moved the plunger almost to its uppermost position and a slight further movement of the cam will force the studs or projections 46 across the apices or widest points of the plate 42 and thus cause the rollers or studs 46 to act upon the upper inclined edges of the plate 42, which will result in the plate and the rod being moved quickly downward and the valve opened. When the cam 40 clears the roller 38 on the plunger the plunger will be retained in its uppermost position by the contact of the rollers or studs 46 with the upper inclined edges of the plate 42. As the cam shaft continues to rotate the cam 41 will force the plunger downwardly and just before the plunger reaches the lower limit of its movement by the cam 41 the rollers 46 on the levers 43 will again pass the wide points or apices of the plate 42 and will act upon the lower inclined edges of the plate to impart upward movement to the actuating rod and thus close the valve. The cams on the shaft 22 are so arranged with relation one to the other that the valve 14 of the waste pipe will be opened either simultaneously with, or slightly before the valve 10 in the regenerating solution pipe, thus preventing any of the regenerating solution from entering the water softening unit while it is connected with the service pipe. It will be apparent that when the valves 10 and 14 have been opened the regenerating solution will be carried into the container 1 by the water delivered thereto through the pipe 6 and the flow of regenerating solution to the container will continue until the cam 30 has again closed the valve 10. The closing of the valve 10 will take place in a less period of time than will the closing of the valve 14, due to the arrangement of the cams, and consequently the water from the supply pipe will continue to flow through the container after the supply of regenerating solution has been interrupted, thereby causing the container to be rinsed or washed out by this additional water, which will also flow through the drain pipe. When sufficient water has passed through the container to thoroughly rinse the same the valve 14 is again closed and the water in the supply pipe will pass through the container to the service pipe.

The injector 11 which is inserted in the supply pipe 6 for the purpose of introducing regenerating solution therein will reduce the flow of water through the supply line to the softening device and when the pressure at the source of supply is low the pressure in the container 1 may be so reduced that the soft water will not be delivered to all of the outlets of the service line. In order that there may be at all times sufficient pressure in the container during the softening operation I have provided means for by-passing the water about the injector during the softening operation. As here shown, a by-pass 148 is connected with the supply pipe 6 on opposite sides of the injector and is provided with a valve 149 which is so connected with the valve operating mechanism that it will be open during the water softening period but will be closed during the reconditioning operations. As here shown, this valve is actuated by a lever 150 which is connected by a link 151 with one arm of a bell crank lever 152, the other arm of which is connected by a link 153 with one arm of a second bell crank lever 154, the other arm of which is connected by a rod 155 with the actuating rod 36 of the quick opening device for the valve 14 in the drain pipe, the arrangement being such that when the valve 14 is open the valve 149 will be closed and when the valve 14 is closed the valve 149 will be open, thus permitting the water in the supply pipe to follow the line of least resistance and flow through the by-pass to the container.

In order to supply water to the service line during the reconditioning operation I have interposed between the water softening unit and the service line a storage tank, as shown at 47. A pipe 48 communicates with this storage receptacle near the bottom thereof and is connected at its upper end with the service line, the connection being, in the present instance, formed at the point of connection of the pipe 7 and the main service pipe 4. Conseqeuntly when the water softening unit is connected with the service line the tank 47 will be subjected to city pressure and as the water enters that tank the air in the latter will be compressed and the water stored therein under city pressure. So long as the connection between the service line and the water softening unit is maintained the water will pass directly from the container 1 to the service line but when this connection is interrupted the water will flow from the storage receptacle 47 to the service line whenever an outlet in the service line is opened. The storage tank may be of any suitable capacity but preferably is of such a size that it will provide an adequate supply of water for ordinary purposes during the reconditioning period.

The regenerating solution or brine may be generated and delivered to the tank 8 in any suitable manner but in an automatic apparatus of this character it is desirable that a relatively large supply of salt should be provided so that the apparatus will operate over a relatively long period without attention. I have therefore provided a salt receptacle 49 of relatively large capacity, which, in the present instance, is separate from the brine tank 8 and has its upper portion connected with that tank, by means of a conduit 50. The water is delivered to the salt receptacle 49 from the hard water supply pipe 6 and the amount of water so delivered is automatically controlled to maintain the desired amount of brine in the tank 8. As here shown, pipe 51 leads from the supply pipe 6 to a valve 52 by means of which it is connected with a pipe 53 which extends into the salt receptacle and to a point near the bottom thereof. The valve 52 is controlled by a float 54 arranged in the brine tank 8 so as to maintain the liquid in the salt receptacle 49 and in the brine tank at the desired level. The pipe 63 which delivers the water to the salt receptacle preferably discharges near the bottom of that receptacle so that the water will flow upwardly through the salt in the receptacle. Where the water is delivered to the top of the receptacle it has a tendency to pack the salt to such an extent that the water will not flow through the same. By introducing the water beneath the salt, or near the bottom thereof, the upward flow of the water will keep the salt from packing and the water will flow freely through the same.

In order that the proper amount of regenerating solution or brine may be carried into the water softening unit by the hard water it is desirable that the flow of water should be confined between certain maximum and minimum limits and for this purpose there may be interposed in the supply pipe 6, at any suitable point, a flow regulating device, such as is shown as a whole at 55 in Figs. 1, 8 and 9, and which is of such a character that it will maintain a substantially constant rate of flow of water through the supply pipe regardless of fluctuations of pressure in the supply line. To accomplish this the supply line is provided with a restricted orifice and means are provided for maintaining a substantially constant difference in pressure on the opposite sides of that orifice, which naturally results in a substantially uniform flow of water through the orifice. The apparatus as here shown comprises a casing 56 having formed therein a chamber 57, the upper end of which is closed by a diaphragm 58. Leading into the chamber 57 is a conduit 59 which is connected with the outer side of the supply pipe and forms in effect a part of that pipe. The connection between this conduit and the chamber 57 is valve controlled, a balanced valve 60 being utilized for this purpose in the present device. As here shown, the valve 60 has at its upper end a stem 61 which is guided in a cross bar or bracket 62 on the upper side of the conduit 59, and has at its lower end a stem 63 which is guided in a suitable bearing in the bottom of the casing 56. A spring 64 which is confined between the bottom of the casing and a nut 65 adjustably mounted on the lower portion of the valve tends to move the valve upwardly toward its closed position. The upward movement of the valve is resisted by a suitable yieldable device which, in the present instance, consists of a weight 66 adjustably mounted on a lever 67 one end of which is pivotally mounted on a bracket 68 and which is connected by a link 69 with a second lever 70, the opposite end of which is pivotally mounted on a fixed bracket 71. This lever is connected between its ends with a rod or stem 72 extending upwardly from the diaphragm 58 and connected with that diaphragm. As here shown, the lever 70 is a two-part lever which straddles the stem 72 and is connected thereto by a pin 73. It will be apparent, therefore, that the weight 66 will act on the stem 72 to move the same downwardly and a projection on the lower side of the diaphragm, which may, if desired, consist of the lower end of the stem 72, acts on the valve stem 61 to move the valve toward its open position. The chamber 57 also communicates with an outlet conduit 74 which connects the same with the inner side of the supply pipe and in effect forms a part of the supply pipe. This outlet conduit is provided with a restricted orifice, as shown at 75, through which the water must pass to reach the inner portion of the supply line. This conduit is connected at a point lying beyond the restricted orifice 75 with a tube 76 which leads to a chamber formed in a casing 77 supported above and spaced from the casing 56. The lower side of the chamber 77 is closed by a diaphragm 78 which is similar in character and area to the diaphragm 58 and which is connected with the upper end of the rod 72. It will be apparent therefore that the lower diaphragm 58 is subjected to the pressure of the water entering the device through the supply pipe and that the diaphragm 78 is subjected to the pressure in the conduit 74. If the pressure in the chamber 57 increases with relation to the pressure in the conduit 74 the diaphragm 58 will be forced upwardly, thus permitting the spring 64 to move the valve 60 toward its closed position and thus reduce the flow of water to the chamber 57. If the pressure in the conduit 74 increases with relation to the pressure in the chamber 57 this pressure will be transmitted to the diaphragm 78 which will force the rod 72 downwardly and thus cause the valve 60 to be further opened a distance which will admit a sufficiently increased amount of water to the chamber 57 to restore the predetermined difference between the pressures in the chamber 57 and the conduit 74. Assuming that the apparatus is so adjusted as to maintain a difference of ten pounds between the pressure in the chamber 57 and the pressure in the conduit 74 it will be apparent that any fluctuation of the pressures which would vary this fixed difference will be instantly compensated for by the varying pressures on the two diaphragms, which will result in repositioning of the valve 60. In this manner the same difference in pressure will be maintained at all times regardless of the actual pressures and consequently a substantially uniform flow of water through the supply conduit will result.

While the apparatus is softening water the flow regulating device 55 operates to limit the rate of flow so that the predetermined maximum rate is not exceeded.

In that arrangement of the apparatus above described the liquid flows through the container 1 in the same direction for all three operations. As shown, the flow is always in an upward direction, that is, for water softening purposes, for regeneration and for washing. This arrangement permits of the several operations being fully controlled by the use of the two valves 10 and 14 and the check valve 15. The injector 16 has been added as an extra precaution and is not necessary and in some cases may be omitted. In many installations this arrangement of the apparatus is preferred because of its simplicity and the low cost of production and installation. In other installations and under certain service conditions it is desired that the fluid shall flow in different directions during different operations. This can be readily accomplished by a rearrangement of the piping and the use of additional valves. In Figs. 10, 11, 12 and 13, I have shown certain rearrangements of the apparatus which result in the fluid flowing in different directions during the different operations. In these figures, for the sake of simplicity of illustration, I have omitted the storage tank, the salt storage receptacle and the flow regulator but it will be understood that any or all of these parts may be used in connection with the devices shown in Figs. 10 to 13. It will be obvious that they may be added thereto without other change of the mechanism.

In that arrangement of the apparatus shown in Fig. 10 the supply pipe 80 is divided into two branches, 81 and 82, entering the container 83 near the lower and upper ends thereof, respectively. The service pipe 84 leads from the lower portion of the container. The brine tank 85 is connected by a pipe 86 with the upper part of the container through the branch 82 of the supply pipe and is controlled by a valve 87. The two branches 81 and 82 of the supply pipe are controlled respectively by valves 88 and 89. Two drain pipes are provided leading respectively from the upper and lower portions of the container and, in the present arrangement, these drain pipes are, for the purpose of simplicity, connected with the container through the respective branches of the supply pipe. One of these drain pipes is shown at 90 as connected with the branch 82 of the supply pipe between the valve 89 and the container and is controlled by a valve 91. A second drain pipe 92 is connected with the lower portion of the container through the branch 81 of the supply pipe and is controlled by a valve 93. During the water softening operation the valve 88 of the lower branch of the supply pipe, the valves 91 and 93 of the drain pipes and the valve 87 of the regenerating solution pipe, are closed, the valve 89 in the branch 82 of the supply pipe only being open, thus causing the water to enter the container near the upper end thereof and to pass downwardly through the water softening material and out through the service pipe 84, which is here shown as controlled by a check valve 94 similar to that heretofore described. The arrangement here shown permits of a preliminary upward flow of wash water to dislodge and remove any sediment which may have accumulated on the upper surface of the water softening material. This upward flow of wash water is secured by closing the valve 89 of the branch 82 of the supply pipe and opening the valve 88 of the branch 81 of the supply pipe and the valve 91 of the drain pipe 90, thereby permitting the water to enter the container at the lower end and to pass upwardly therethrough and out through the drain pipe 90. At the end of the preliminary washing operation the valves 91 and 88 are closed and the valve 89 of the branch 82 of the supply pipe, the valve 87 of the regenerating solution pipe and the valve 93 of the drain pipe 92 are opened, thus causing the water and regenerating solution to enter the container at the upper end thereof and to be discharged from the drain pipe 92 from the bottom of the container. At the end of the regenerating operation the valve 87 is closed so that clear water will pass downwardly through the container and out through the drain pipe 92. At the end of this final washing operation the valve 93 is closed, thus causing the water which enters the container through the branch 82 of the supply pipe to be discharged through the service pipe 84. The several valves are automatically controlled by the operation of a motor 95 which operates the valve actuating devices. In the arrangement here shown the valves 88, 89 and 91 are all actuated by a single quick opening device 96 similar to that shown in Figs. 2, 4 and 5, but extended so that it may be connected with the three valves. The connections between the quick opening device and the valves are such that the valves 88 and 91 will be opened and the valve 89 closed simultaneously, and vice versa. A second quick opening device 97 is connected with the drain valve 93, and the valve 87 of the regenerating solution pipe is controlled by an operating device 98 similar to that shown in Fig. 6.

The arrangement shown in Fig. 11 is similar to that shown in Fig. 10 except that the flow of water being softened is upward and the preliminary upward flow of wash water is eliminated. As there shown, the supply pipe 99 is divided into two branches, 100 and 101, controlled by separate valves 102 and 103 respectively and these branches lead respectively to the lower and upper ends of the container 104. The service pipe 105 leads from the upper end of the container and is controlled by a positively operated valve 106. A single drain pipe 107 is connected with the lower portion of the container and, in the present instance, this connection is made through the branch 100 of the supply pipe. The drain pipe 107 is controlled by a valve 108. The brine tank 109 is connected by a pipe 110 with the upper branch 101 of the supply pipe and is controlled by a valve 111. During the softening operation the valves 111, 103 and 108 are closed and the valve 102 in the branch 100 of the supply pipe and the valve 106 in the service pipe are open. During the regenerating operation the valves 102 and 106 are closed and the valve 103 in the branch 101 of the supply pipe is open, the valve 111 of the regenerating solution pipe is open and the valve 108 of the drain pipe is open, thus causing the water and salt solution to enter the upper end of the container to be discharged from the lower end thereof through the drain pipe 107. At the end of the regenerating operation the valve 111 is closed and the wash water flows downward through the container and out through the drain pipe 107. At the end of the washing operation the valves 108 and 103 are closed and the valves 102 and 106 are opened, thus again establishing the softening operation. The valves 102, 103, 106 and 108 are all actuated by a single quick opening device 112 similar to that above described and the valve 111 is controlled by a cam operated device 113 also similar to that above described and both valve actuating devices are operated by a motor 114 interposed in the supply pipe 99.

That arrangement shown in Fig. 12 utilizes an upward flow of water during the softening operation and a downward preliminary flow of wash water, this being particularly useful where the water which is being softened carries a large amount of sediment which will collect on the lower surface of the water softening material and should be dislodged prior to the regenerating operation. Here also a supply pipe 115 is divided into two branches, 116 and 117, which are controlled by separate valves 118 and 119 respectively and are connected respectively with the lower and upper ends of the container 120. The service pipe 121 leads from the upper end of the container and is controlled by a positively operated valve 122. A drain pipe 123 is connected with the upper portion of the container through the branch 117 of the supply pipe and is controlled by a valve 124. A second drain pipe 125 is connected with the lower part of the container through the branch 116 of the supply pipe and is controlled by a valve 126. The regenerating solution pipe 127 is connected with the lower part of the container through the branch 116 of the supply pipe and is controlled by a valve 128. During the water softening operation the valve 119 of the branch 117 of the supply pipe, the valve 128 of the regenerating solution pipe and the valves 124 and 126 of the drain pipes are closed and the valve 118 of the branch 116 of the supply pipe and the valve 122 of the service pipe are open, thus causing the water to be softened to flow upwardly through the water softening material and out through the service pipe 121. At the beginning of the reconditioning operation the valves 118 and 122 are closed and the valve 119 in the branch 117 of the supply pipe and the valve 126 of the drain pipe 125 are opened, thus causing the downward flow of wash water through the water softening material. At the end of this preliminary washing operation the valves 119 and 126 are closed and the valve 118 of the branch 116 of the supply pipe, the valve 128 of the regenerating solution pipe and the valve 124 of the drain pipe 123 are opened, thus causing the water and regenerating solution to enter the lower end of the container and pass upwardly therethrough and out through the drain pipe 123. It is not necessary that the valve 122 in the service line should be closed during the upward flow of the liquid and as a matter of convenience of operation it may be so connected with the valve actuating mechanism that it will be open during the regenerating operation, the check valve in the service line insuring against back flow of water therefrom. At the end of the regenerating operation the valve 128 is closed so that clear water will pass up through the water softening material and out through the drain pipe 123. At the end of this final washing operation the valve 124 is closed, thus restoring the water softening operation. The valves 118, 126, 119 and 122, are all actuated by a single quick opening device 129. A second quick opening device 130 controls the valve 124, and an actuating device 131 controls the valve 128. The quick opening devices 129 and 130 are similar to those shown in Figs. 2, 4 and 5, while the actuating device 131 is similar to that shown in Fig. 6, all of which are controlled from a motor 132 interposed in the main supply line 115.

In the arrangement shown in Fig. 13, a main supply pipe 133 is divided into two branches 134 and 135 connected respectively with the lower and upper ends of a container 136 and controlled respectively by valves 137 and 138. The service pipe 139 leads from the lower end of the container 136 and is provided with a check valve 140. A single drain pipe 141 is connected with the upper part of the container through the branch 135 of the supply pipe and is controlled by a valve 142. A regenerating solution pipe 143 is connected with the lower branch 134 of the supply pipe and is controlled by a valve 144. During the softening operation the valves 137, 142 and 144 are closed and the valve 138 is open, thus causing the water to enter the upper end of the container and to be discharged from the lower end thereof. During the regenerating operation the valve 138 is closed and the valve 137 in the lower branch of the supply pipe is opened and the valve 144 in the regenerating solution pipe and the valve 142 in the drain pipe are open. Thus the water and regenerating solution will flow upward through the water softening material and out through the drain pipe 141. At the end of the regenerating operation the valve 144 is closed and water only will pass upwardly through the water softening material and out through the drain pipe 141. At the end of the reconditioning operation the valves 142 and 137 are closed and the valve 138 opened. The valves 137, 138 and 142 are controlled by a single quick opening device 145 similar to that shown in Figs. 2, 4 and 5, and the regenerating solution valve 144 is controlled by an actuating device 146 similar to that shown in Fig. 6 and both actuating devices are controlled by a motor 147.

By utilizing a storage receptacle in connection with a single water softening unit a continuous supply of soft water may be secured or, if desired, two or more water softening units may be included in the single installation, with separate controlling devices, and by a proper timing of the valves the reconditioning operations of the different units may be caused to take place at different times, thus insuring that at least one water softening unit will always be in operation thereby providing a continuous supply of soft water.

Where a single water softening unit is employed without the storage receptacle it is desirable that hard water should be available when soft water is not available, and, in Fig. 14, I have shown an installation similar to that shown in Fig. 1, except that the storage tank is omitted and the service line 4 is connected with the pipe 6 by means of a by-pass 156. The by-pass is controlled by a valve 157 which is so connected with the valve actuating mechanism that it will be opened during the reconditioning operations and closed during the water softening operation. As here shown, the valve is actuated by a lever 158 which is connected by a link 159 with the bell crank lever 152 forming part of the actuating mechanism for the valve 149 of the by-pass 148. The arrangement is such that when the valve 14 of the drain pipe 5 is open the valve 157 will also be open, thus permitting the water to flow directly from the supply pipe to the service line, but when the valve 14 is closed the valve 157 will also be closed, thereby forcing the water to pass through the water softening unit. Preferably the by-pass is provided with a restricted orifice, as shown at 160, which will cause a reduction in the pressure in the service line, thus notifying the user that he is receiving hard water instead of soft water. This reduced orifice also serves to insure the passage through the injector of a quantity of water sufficient to introduce the regenerating solution into the container.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. In a water softening apparatus, a container for water softening material, a supply pipe for hard water, a service pipe, a drain pipe and a pipe for regenerating solution, all connected with said container, normally closed valves in said drain pipe and said regenerating solution pipe, and valve actuating means moved and controlled by the flow of water in said supply pipe to said container to open both of said valves, to thereafter first close the valve in said regenerating solution pipe and then close the valve in said drain pipe.

2. In a water softening apparatus, a container for water softening material, a supply pipe for hard water, a service pipe, a drain pipe and a pipe for regenerating solution, all connected with said container, normally closed valves in said drain pipe and said regenerating solution pipe, means controlled by the flow of water through said supply pipe to open both of said valves, to then first close the valve in said regenerating solution pipe and to then close the valve in said drain pipe, and means controlled by the valve in said drain pipe for interrupting the connection between said service pipe and said container while said valve is open.

3. In a water softening apparatus, a casing to contain water softening material, a supply pipe for hard water having communication with said casing during all operating periods of said apparatus including a regenerating period, an outlet for said casing, a water meter and means controlled by the meter in accordance with the quantity of water delivered to said casing during the regenerating period for introducing regenerating solution into hard water which is delivered to said casing by said supply pipe.

4. In a water softening apparatus, a container for water softening material, a supply pipe for hard water having constant connection with said container, a service pipe leading from said container, a drain pipe leading from said container, means for introducing regenerating solution into hard water which is delivered to said container by said supply pipe, and means controlled by the flow of hard water through said supply pipe for interrupting the connection between said service pipe and said container and for establishing the connection between said drain pipe and said container while said regenerating solution is being introduced into said container.

5. In a water softening apparatus, a container for water softening material, a supply pipe for hard water having communication with said container during all operating periods of said apparatus, a service pipe leading from said container, a drain pipe leading from said container, a regenerating solution pipe connected with said supply pipe, a valve to control the flow of solution through said regenerating solution pipe, and means controlled by the flow of water through said supply pipe to open and close said valve at intervals.

6. In a water softening apparatus, a container for water softening material, a supply pipe for hard water having communication with said container during all operating periods of said apparatus, a service pipe leading from said container, a drain pipe leading from said container, a regenerating solution pipe connected with said supply pipe, valves to control the flow of liquid through said drain pipe and through said regenerating solution pipe, and means controlled by the flow of water through said supply pipe to open and close said valves.

7. In a water softening apparatus, a container for water softening material, a supply pipe for hard water having communication with said container during all operating periods of said apparatus, a service pipe leading from said container, a drain pipe leading from said container, a regenerating solution pipe connected with said supply pipe, valves to control the flow of liquid through said drain pipe and through said regenerating solution pipe, and means controlled by the flow of water through said supply pipe to open said valves at substantially the same time and to first close the valve for said regenerating solution pipe and to then close the valve to said drain pipe.

8. In a water softening apparatus, a container for water softening material, a supply pipe for hard water having connection with said container, a service pipe leading from said container, a drain pipe leading from said container, a regenerating solution pipe connected with said supply pipe, valves to control the flow of liquid through said drain pipe and through said regenerating solution pipe, means controlled by the flow of water through said supply pipe to open said valves at substantially the same time and to first close the valve for said regenerating solution pipe and to then close the valve to said drain pipe, and means for interrupting the connection between said service pipe and said container while either of said valves is open.

9. In a water softening apparatus, a container for water softening material, a supply pipe for hard water having connection with said container, a service pipe connected with said container, a drain pipe connected with said container, a regenerating solution pipe leading to said supply pipe, an injector interposed in said supply pipe and connected with said regenerating solution pipe, whereby the flow of hard water through said injector will cause regenerating solution to be carried into said container along with said hard water, and means controlled by the flow of water through said supply pipe for establishing and interrupting the flow of regenerating solution to said injector.

10. In a water softening apparatus, a container for water softening material, a supply pipe for hard water having constant connection with said container, a service pipe leading from said container, a drain pipe leading from said container, a regenerating solution pipe leading to said supply pipe, an injector interposed in said supply pipe and connected with said regenerating solution pipe, whereby the flow of hard water through said injector will cause regenerating solution to be carried into said container along with said hard water, a by-pass interposed in said supply pipe and extending about said injector, valves in said regenerating solution pipe and in said by-pass, and means controlled by the flow of water through said supply pipe for so actuating said valves that when one valve is open the other valve will be closed.

11. In a water softening apparatus, a container for water softening material, a supply pipe to supply hard water to said container, a service pipe connected with said container, a drain pipe connected with said container, a source of supply for regenerating solution having means for connecting the same with said container while water is being delivered to said container by said supply pipe, a water meter in the supply pipe and means controlled by the water meter to establish the connection between said source of supply for regenerating solution and said container, said last named means being also controlled by said meter to interrupt said connection after a predetermined quantity of water has been delivered to said container by said supply pipe.

12. In a water softening apparatus, a container for water softening material, a supply pipe for hard water having communication with said container during all operating periods of said apparatus, a service pipe, a drain pipe and a pipe for regenerating solution all connected with said container, means to terminate the flow of water to said service pipe, and mechanism automatically controlled according to an initial predetermined quantity of water passing through said supply pipe to said container to pass regenerating solution through said container to said drain pipe, said mechanism being also automatically controlled according to a further predetermined quantity of water passing through said supply pipe to said container to thereafter pass wash water from said supply pipe through said container to said drain pipe.

13. In a water softening apparatus, a container, for water softening material, a supply pipe for hard water having connection with said container, a service pipe, a drain pipe and a pipe for regenerating solution, all connected with said container, normally closed valves for respectively controlling the flow of liquid through said regenerating solution pipe and said drain pipe, and mechanism automatically controlled by an initial predetermined quantity of water delivered to said container to open both of said valves, said mechanism being also automatically controlled by the delivery of a further predetermined quantity of water to said container by said supply pipe to thereafter close the valve in said regenerating solution pipe and said mechanism being also controlled by the delivery of a third predetermined quantity of water to said container by said supply pipe to close the valve in said drain pipe.

14. In a water softening apparatus, a container for water softening material, a supply pipe for hard water connected with said container, a service pipe connected with said container, a drain pipe leading from said container, a pipe for delivering regenerating solution to said container, valves in said drain pipe and said regenerating solution pipe, a motor moved by the water delivered to said container by said supply pipe, means controlled by said motor in accordance with the quantity of water passing through the same to said container for opening said valves after an initial quantity of water has passed through said motor, means also controlled by said motor for closing the valve in said regenerating solution pipe after a further predetermined quantity of water has passed through said motor and means also controlled by said motor for closing the valve in said drain pipe after a third predetermined quantity of water has passed through said motor.

15. In a water softening apparatus, a container for water softening material, a supply pipe for hard water having constant communication with said container during all operating periods of said apparatus, a service pipe connected with said container, a drain pipe leading from said container, a pipe for delivering regenerating solution to said container, valves in said drain pipe and in said regenerating solution pipe, a motor connected with said supply pipe and moved by flow of the water on its way to said container, and means intermediate of said motor and said valves for opening and closing said valves at, intervals determined by the several quantities of water delivered to said container by said supply pipe and passing through said motor during successive operating periods.

16. In a water softening apparatus, a container for water softening material, a supply pipe for hard water connected with said container, a service pipe connected with said container, a drain pipe connected with said container, a pipe to introduce regenerating solution into the water flowing through said supply pipe, valves to control the flow of liquid through the regenerating solution pipe and said drain pipe, an actuating device for opening and closing said valves in timed relation one to the other, a motor interposed in said supply pipe and actuated by the water flowing through the same, and an operative connection between said motor and said valve actuating device.

17. In a regenerative base exchange water softener, a container for water softening material, a supply pipe for hard water having communication with said container during all operating periods of said softener, a service pipe to convey soft water from said container, a drain pipe leading from said container, a pipe for delivering regenerating solution to said container, valves opening and closing said drain pipe and said regeneration solution pipe, a motor moved by flow of the water flowing from said supply pipe through said container, means for actuating said valves and means intermediate of the motor and the valve actuating means for transmitting the motion of the motor to control the opening of said valves at approximately the same time and the subsequent closing of said valves at different times, said control being in accordance with several predetermined quantities of water passing through said motor during successive operating periods.

18. In a water softening apparatus, a single container for water softening material, a hard water supply pipe having communication with said container during all operating periods of said apparatus, a service pipe to convey soft water from said container, a drain pipe leading from said container, a pipe for delivering regenerating solution to said container, valves in said drain pipe and said regenerating solution pipe, an actuating device for the valve in said regenerating solution pipe, a second actuating device comprising means for quickly moving the valve in said drain pipe from one position to the other, a motor moved by flow of the water passing through said container from said supply pipe and means intermediate of the motor and the valve actuating devices for transmitting the motion of the motor to control the activation of said valves in accordance with several predetermined quantities of water passing through said motor during successive operating periods.

19. In a water softening apparatus, a container for water softening material, a pipe to supply hard water to said container, a service pipe to convey soft water from said container, a drain pipe leading from said container, a pipe for delivering regenerating solution to said container, valves in said drain pipe and said regenerating solution pipe, an actuating device for the valve in said regenerating solution pipe, a second valve actuating device comprising a member operatively connected with the valve in said drain pipe, a second member mounted for movement relatively to the first mentioned member, and means connected with said second member to impart operative movement to the first mentioned member when said second member has been moved to a predetermined position with relation to the first mentioned member, and means controlled by the water delivered to said container by said supply pipe for actuating said second member and for operating the first mentioned valve actuating device.

20. In a water softening apparatus, a container for water softening material, a supply pipe for hard water having communication with said container during all operating periods of said apparatus, a service pipe leading from said container, a drain pipe leading from said container, an injector in said supply pipe, and a source of supply for regenerating solution connected with said injector, and a valve interposed between said source of supply for regenerating solution and said injector to terminate the flow of regenerating solution to said injector.

21. In a water softening apparatus, a container for water softening material, a supply pipe for hard water leading to said container, a service pipe leading from said container, a drain pipe leading from said container, means for delivering regenerating solution to said container, a valve in said drain pipe to control the flow of water through the same, an injector interposed between said container and said drain pipe, connected with said service pipe and arranged to prevent the entrance of water into said service pipe when the valve in said drain pipe is open.

22. In a water softening apparatus, a container for water softening material, a supply pipe for delivering hard water to said container, a service pipe for conveying soft water from said container, a drain pipe connected with said container, a generating tank for salt solution comprising a receptacle adapted to contain a quantity of salt, means for introducing water into said salt receptacle near the bottom thereof, and means for conveying salt solution from the upper portion of said receptacle to said container.

23. In a water softening apparatus, a container for water softening material, a supply pipe for delivering hard water to said container, a service pipe for conveying soft water from said container, a drain pipe connected with said container, a generating device for salt solution comprising a receptacle adapted to contain a quantity of salt, means for introducing water into said salt receptacle near the bottom thereof, means comprising a pipe for delivering salt solution from the upper portion of said salt receptacle to said container, and means controlled by the flow of water through said supply pipe to control the introduction of said salt solution into said container.

24. In a water softening apparatus, a container for water softening material, a supply pipe for delivering hard water to said container, a service pipe for conveying soft water from said container, a drain pipe connected with said container, a generating device for salt solution comprising a tank, a pipe connected with said tank for delivering said salt solution to said container, a receptacle adapted to contain a quality of salt and connected at its upper end with said tank, means for delivering water to said salt receptacle near the bottom thereof, and means controlled by the level of the solution in said tank for controlling the flow of water to said salt receptacle.

25. In a water softening apparatus, a container for water softening material, a supply pipe for hard water connected with said container, a service pipe connected with said container, a drain pipe connected with said container, a brine tank, means comprising a pipe for connecting said brine tank with said container, means controlled by the flow of hard water through said supply pipe for automatically controlling the delivery of salt solution to said container, a receptacle adapted to contain a quantity of salt, a connection between the upper portion of said receptacle and said salt solution tank, a pipe connected with said supply pipe and discharging into said salt receptacle at a point near the bottom thereof, a valve to control the flow of water through the last mentioned pipe, and a float arranged within said salt solution tank and operatively connected with said valve.

26. In a water softening apparatus, a container for water softening material, a supply pipe leading to said container, a service pipe leading from said container, a drain pipe leading from said container, means controlled by the flow of water through said supply pipe for delivering regenerating solution to said container, and means for maintaining a substantially uniform flow of water through said supply pipe.

27. In a water softening apparatus, a container for water softening material, a supply pipe leading to said container, a service pipe leading from said container, a drain pipe leading from said container, means for introducing a regenerating solution into said container, and means for maintaining a substantially uniform the flow of water through said supply pipe.

28. In a water softening apparatus, a container for water softening material, a supply pipe leading to said container, a service pipe leading from said container, a drain pipe leading from said container, an injector interposed in said supply pipe, a regenerating solution pipe connected with said injector and means for maintaining a substantially uniform flow of water through said supply pipe.

29. In a water softening apparatus, a container for water softening material, a supply pipe for hard water leading to said container, a service pipe leading from said container, a drain pipe leading from said container, a regenerating solution pipe connected with said supply pipe for hard water, a valve to control the flow of regenerating solution through said last mentioned pipe, means controlled by the flow of water through said supply pipe for automatically controlling said valve, and means for maintaining a substantially uniform flow of water through said supply pipe.

30. In a water softening apparatus, a container for water softening material, a hard water supply pipe leading to said container, a service line leading from said container, a drain pipe connected with said container, means controlled by the flow of water through said supply pipe for delivering regenerating solution to said container, said supply pipe for hard water comprising a restricted orifice of fixed area, and means for maintaining a substantially fixed difference of pressure in said supply line on the opposite sides of said restricted orifice.

31. In a water softening apparatus, a container for water softening material, a hard water supply line leading to said container, a service line leading from said container, a drain line connected with said container, means for delivering regenerating solution to said container, a restricted orifice in one of said lines, means for maintaining a substantially fixed difference of pressure in said line on the opposite sides of said restricted orifice, a valve interposed in said supply line in advance of said orifice, and means controlled by the pressure of water in said supply line on the opposite sides of said orifice for controlling the position of said valve.

32. In a water softening apparatus, a container for water softening material, a hard water supply conduit leading to said container, a service conduit leading from said container, a drain conduit connected with said container, means for delivering regenerating solution to said container, and means for automatically limiting the rate of flow of water through said container from the supply conduit comprising a restriction for the flow of water and valve means controlled by the head loss through said restriction for throttling the flow of water.

33. In a water softening apparatus, a container for water softening material, a supply pipe leading to said container, a service pipe to receive softened water from said container, means for delivering regenerating solution to said container, means comprising a valve to control the delivery of wash water to said container, a motor operated solely by water delivered to said container by said supply pipe, means controlled by said motor to open and close said valve at intervals determined by the several quantities of water delivered to said container during different operating periods, and means to interrupt the flow of water from said container to said service pipe while said valve is open.

34. In a water softening apparatus, a container for water softening material, a supply pipe for hard water leading to said container, means for delivering regenerating solution to said container, a drain pipe leading from said container, a valve to control said drain pipe and means moved by the water delivered to said container by said supply pipe to open said drain valve after a predetermined quantity of water has been delivered to said container by said supply pipe, said means being adapted to close said valve after a further predetermined quantity of water has been delivered to said container by said supply pipe.

35. In a water softening apparatus, a casing having a compartment to contain water softening material, a supply pipe delivering hard water to said compartment during all operating periods of said apparatus, a service pipe having communication with said compartment, a drain pipe having communication with said compartment, a valve in said drain pipe, means for introducing regenerating solution into said compartment, and means operated by liquid delivered to said compartment by said supply pipe for opening and closing said drain valve.

36. In a water softening apparatus, a container for water softening material, a hard water supply pipe having communication with said container during all operating periods of said apparatus, a soft water service pipe leading from said container, a source of supply for regenerating solution, a water meter and valve means automatically controlled by the meter in accordance with the several quantities of water delivered to said container by said supply pipe and passing through the meter during different operating periods for interrupting the delivery of water from said supply pipe through said container to said service pipe, for connecting said container with said source of supply for regenerating solution, for causing wash water to be delivered to said container by said supply pipe after a quantity of regenerating solution has been delivered thereto, and for then again connecting said supply pipe through said container with said service pipe.

37. In a water softening apparatus, a single container for water softening material, a service pipe connected with said container, a supply pipe for hard water leading to said container, an injector in said supply pipe through which all the water to be softened passes to said container, and means for delivering regenerating solution to said injector.

38. In a water softening apparatus, a casing having a compartment to contain a bed of water softening material, a supply pipe for water to be softened having communication with said compartment on one side of said bed of material during all operating periods of said apparatus, a service pipe having communication with said compartment on the other side of said bed of material, a drain pipe having communication with said compartment, a valve in said drain pipe, means for introducing regenerating solution into said compartment, a motor moved by flow of the water on its way to said compartment through said supply pipe, and means controlled by said motor for opening said drain valve when a predetermined quantity of water to be softened has been passed through said motor, said motor-controlled means being adapted to subsequently close said drain valve when a further predetermined quantity of water has passed through said motor.

39. In a water softening apparatus, a single container for water softening material, a service pipe connected with said container, a supply pipe supplying hard water to said container, an injector in said supply pipe through which wash water passes to said container, means for delivering regenerating solution to said injector, and means for causing measured quantities of fluid to pass through said injector.

40. In a water softening apparatus, a container for water softening material, a supply pipe for delivering hard water to said container, a service pipe for conveying soft water from said container, a drain pipe connected with said container, a generating tank for salt solution comprising a receptacle adapted to contain a quantity of salt, power operated means for causing water to be introduced into said salt receptacle near the bottom thereof, and means for conveying liquid from said receptacle after it has passed through salt contained therein.

41. In a water softening apparatus, a container for water softening material, a pipe to deliver liquid to said container, an injector in said pipe, a tank for regenerating solution, a conduit connecting said tank with said injector, valve means in said conduit for initiating and terminating the flow of regenerating solution to said injector, and power controlled mechanism for actuating said valve means.

42. In a water softening apparatus, a container for water softening material, a pipe to deliver liquid to said container, an injector so connected with said pipe and said container that liquid will flow through the same to said container during all operative periods of said apparatus, a tank for regenerating solution, a conduit connecting said tank with said injector, and valve means in said conduit for initiating and terminating the flow of regenerating solution to said injector.

43. In a water softening apparatus, a container for a bed of water softening material, a supply conduit for hard water communicating with said container on one side of said bed of material during all operative periods of said apparatus, a service conduit communicating with said container on the other side of said bed of material, valve means for causing regenerating solution to be delivered to said container, a water meter measuring the several flows of hard water during said operative periods and means intermediate of the meter and the valve means to transmit motion from the water meter to control the opening and the closing of the valve means starting and stopping the delivery of regenerating solution in response to several predetermined quantities of water measured by the meter.

44. In a water softening apparatus, a container for water softening material, a supply pipe leading to said container, means for delivering regenerating solution to said container, a drain pipe leading from said container, a valve to control said drain pipe, and means controlled by the fluid delivered to said container to open said drain valve after a predetermined quantity of fluid has passed through said container and to then close the same after a second predetermined quantity of fluid has passed through said container.

45. In a water softening apparatus comprising a container for water softening material with connection to a hard water supply line, a soft water service line, a source of regenerating solution and to a drain, valve means controlling all the operations of the apparatus, means for actuating said valve means and means having motion imparted by flow of the water passing through said supply line for starting and stopping said valve actuating means at respective time intervals determined by several predetermined quantities of said water flow.

46. In a water softening apparatus, a container for water softening material, a supply pipe for hard water having constant connection with said container, a service pipe leading from said container, a drain pipe leading from said container, means for introducing regenerating solution into hard water which is delivered to said container by said supply pipe, and means controlled by the hard water flowing through said supply pipe for interrupting the connection between said service pipe and said container and for establishing the connection between said drain pipe and said container while said regenerating solution is being introduced into said container.

EDWARD T. TURNER.